United States Patent
Polesel-Maris et al.

(10) Patent No.: US 11,601,070 B2
(45) Date of Patent: Mar. 7, 2023

(54) TRIBOELECTRIC GENERATOR WITH EMBOSSED HONEYCOMB PATTERN

(71) Applicant: LUXEMBOURG INSTITUTE OF SCIENCE AND TECHNOLOGY (LIST), Esch-sur-Alzette (LU)

(72) Inventors: Jerome Polesel-Maris, Mexy (FR); Damien Lenoble, Belvaux (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 207 days.

(21) Appl. No.: 16/756,053

(22) PCT Filed: Oct. 18, 2018

(86) PCT No.: PCT/EP2018/078640
§ 371 (c)(1),
(2) Date: Apr. 14, 2020

(87) PCT Pub. No.: WO2019/077077
PCT Pub. Date: Apr. 25, 2019

(65) Prior Publication Data
US 2020/0244189 A1      Jul. 30, 2020

(30) Foreign Application Priority Data

Oct. 19, 2017   (LU) .................................. LU100485

(51) Int. Cl.
*H02N 1/04*          (2006.01)
(52) U.S. Cl.
CPC ..................................... *H02N 1/04* (2013.01)
(58) Field of Classification Search
CPC ....................................................... H02N 1/04
(Continued)

(56) References Cited

U.S. PATENT DOCUMENTS

| 9,595,894 B2 * | 3/2017 | Wang ........................ H02N 1/04 |
| 2013/0049531 A1 * | 2/2013 | Wang ........................ H02N 1/04 |
| | | 310/309 |

(Continued)

FOREIGN PATENT DOCUMENTS

| KR | 101767151 B1 | 11/2016 |
| WO | 2014086144 A1 | 6/2014 |
| WO | WO 2014086144 | * 6/2014 |

OTHER PUBLICATIONS

Dongjin Jang et al., Force-assembled triboelectric nanogenerator with high-humidity-resistant electricity generation using hierarchical surface morphology; Elsevier Ltd., Nano Energy (2016) vol. 20, pp. 283-293; supplemental information found at http://dx.doi.org/10.1016/j.nanoen.2015.12.021.

(Continued)

*Primary Examiner* — Ahmed Elnakib
(74) *Attorney, Agent, or Firm* — Sandberg Phoenix & von Gontard, PC

(57) ABSTRACT

A contact charging member for a triboelectric generator, comprising a contact layer with a contact side and a back side, made of a dielectric material that has a triboelectric series rating indicating a propensity to exchange electrons due to a contacting event; and an electrode layer disposed along the back side of the contact layer, wherein the contact side of the contact layer is patterned so as to show a series of circular or hexagonal cavities with a flat bottom. The invention is also directed to triboelectric generator comprising the contact charging member and a process for manufacturing the member.

18 Claims, 5 Drawing Sheets

(58) Field of Classification Search
USPC .................................................. 310/309, 310
See application file for complete search history.

(56) References Cited

U.S. PATENT DOCUMENTS

| | | | |
|---|---|---|---|
| 2014/0246950 A1* | 9/2014 | Wang ........................ | H02N 1/04 310/310 |
| 2016/0065091 A1* | 3/2016 | Wang ........................ | H02N 1/04 310/300 |
| 2017/0187306 A1* | 6/2017 | Yeo ........................ | B29C 33/424 |
| 2018/0294745 A1* | 10/2018 | Park ........................ | C08L 53/00 |
| 2020/0244189 A1* | 7/2020 | Polesel-Maris .......... | H02N 1/04 |

OTHER PUBLICATIONS

International Search Report for corresponding PCT/EP2018/078640, dated Jan. 16, 2019.

\* cited by examiner

TRIBOELECTRIC GENERATOR WITH EMBOSSED HONEYCOMB PATTERN

CROSS-REFERENCE TO RELATED APPLICATIONS

The present invention is the US national stage under 35 U.S.C. § 371 of International Application No. PCT/EP2018/078640, which was filed on Oct. 18, 2018, and which claims the priority of application LU 100485 filed on Oct. 19, 2017, the content of which (text, drawings and claims) are incorporated here by reference in its entirety.

FIELD

The invention is directed to the field of triboelectric generators, more particularly to the field of the contact charging members used in triboelectric generators.

BACKGROUND

The operation of a triboelectric generator is based on placing in contact of a first material and a second material of different natures, a first material having a tendency to donate electrons, the second material preferably having a tendency to capture electrons. By placing in contact materials having different triboelectric properties a transfer of charges is created between these two materials which may be reflected in the form of a difference in potentials or a current. The triboelectric effect may be increased by rubbing the materials against each other.

Prior art patent document published U.S. Pat. No. 3,086,131 discloses a triboelectric generator disclosing the principle of rubbing two different insulating materials for producing electrical power.

Prior art patent document published US 2017/0187307 A1 discloses a triboelectric generator with a first contact charging member and a second contact charging member. The first contact charging member includes a first contact layer and a conductive electrode layer. The first contact layer includes a material that has a triboelectric series rating indicating a propensity to gain electrons due to a contacting event. The conductive electrode layer is disposed along the back side of the contact layer. The second contact charging member is spaced apart from and disposed oppositely from the first contact charging member. It includes an electrically conductive material layer that has a triboelectric series rating indicating a propensity to lose electrons when contacted by the first contact layer during the contacting event. The electrically conductive material acts as an electrode. A mechanism maintains a space between the first contact charging member and the second contact charging member except when a force is applied thereto. The contact faces of the generator can be patterned or textured for enhancing the triboelectric effect. To that end the contact faces can show an array of pyramid structured or box-like structures.

Prior art patent document published US 2016/0028327 A1 discloses also a triboelectric generator where one of the contact members is provided with a rough surface comprising conical micro-tip shaped structures obtained by a heat treatment of the polymer material.

In the publication of Donghyeon Yoo, Dongwhi Choi, Dong Sung Kim, "*Comb-shaped electrode-based triboelectric nanogenerators for bi-directional mechanical energy harvesting*", Microelectronic Engineering 174, 46-51 (2017), it is proposed a triboelectric generator containing a comb-shaped electrode and which is fabricated with a simple thermal nanoimprinting process where a commercially-available metal mesh was used as a stamp to simply impart microtopography on the triboelectric generator to increase electrical output performance. The fabricated generator with the comb-shaped electrode enables to harvest bi-directional mechanical energy (including both lateral and vertical contact/separation), which can be a new strategy to efficiently harvest the energy from complex real mechanical motions.

The publication of Emre Iseri, Senol Mutlu, "*Realization of Triboelectric Energy Harvesters Using Steel-Polymer Microfabrication Methods*", Conference paper: The 30th International Conference on Micro Electro Mechanical Systems (MEMS 2017), At Las Vegas, USA, DOI: 10.1109/MEMSYS.2017.7863533, describes the realization of triboelectric nanogenerators (TENG) developed for wireless and batteryless keyboard applications, using steel-polymer microfabrication methods including lithography, electrochemical etching, hot embossing and thermo-compression bonding. Microfabricated steel electrode and polymer film (polyethylene naphthalate (PEN)) are used for the first time to implement a TENG of conductor-to-dielectric contact-mode type.

In the above cited prior art, sophisticated and potentially expensive methods are provided for patterning a contact charging member in a triboelectric generator. The need for providing a proper and adequate gap between the two contact charging members of triboelectric generators is also acknowledged. However shortcomings and improvements remain.

SUMMARY

The invention has for technical problem to provide efficient and durable triboelectric generators which can also be manufactured at reduced costs.

The invention is directed to a contact charging member for a triboelectric generator, comprising: a contact layer with a contact side and a back side, made of a dielectric material that has a triboelectric series rating indicating a propensity to exchange electrons due to a contacting event; and an electrode layer disposed along the back side of the contact layer; wherein the contact side of the contact layer is patterned so as to show a series of cavities, each with an opening and a bottom that is flexible such as to elastically deform up to the opening.

According to an exemplary embodiment, the cavities show at least one of the following shapes: circular, hexagonal, rectangular.

According to an exemplary embodiment, the back side is patterned in negative and in correspondence with the contact side.

Advantageously, the bottom of the cavities is generally flat.

According to an exemplary embodiment, the patterning of the contact side and/or of the back side is achieved by embossing the contact layer.

According to an exemplary embodiment, the contact layer has a thickness greater than 20 µm and/or less than 50 µm.

According to an exemplary embodiment, the dielectric material of the contact layer is a thermoplastic, which may be selected from the group consisting of fluorocarbon like PTFE, PFA, FEP, PVDF, PVDF, and trFE, polyetheretherketones PEEK, polyetherketones PEK, polyimides PI, polyamideimides PAI, polyamides PA, polyethylenes PE, Polyethylene terephthalate PET Mylar, polyethersulfones PES, polyphenylene sulphides PPS, in various instances fluorinated ethylene propylene FEP or polyimide PI.

According to an exemplary embodiment, the cavities show an average radius that is less than or equal to 2 mm and/or greater than or equal to 0.5 mm.

According to an exemplary embodiment, the cavities show a constant depth that is greater than 50 μm and/or less than 140 μm.

According to an exemplary embodiment, the patterning is honeycomb shaped.

According to an exemplary embodiment, the contact side at the bottom of the cavities shows submicronic or nanostructures thereby increasing the specific contact surface.

The invention is also directed to a triboelectric generator comprising: a first contact charging member comprising a contact layer with a contact side and a back side, made of a dielectric material that has a triboelectric series rating indicating a propensity to exchange electrons due to a contacting event, and an electrode layer disposed along the back side of the contact layer; a second contact charging member comprising a contact layer with a contact side and a back side, made of a dielectric material that has a triboelectric series rating indicating a propensity to exchange electrons due to a contacting event, and an electrode layer disposed along the back side of the contact layer; wherein the first and second contact charging members have their contact side in front of each other and are configured to allow a pressing and/or sliding contact between the contact sides; and wherein the first contact charging member is according to the invention.

According to an exemplary embodiment, the second contact charging member shows a flat contact side in various instances with submicronic and/or nanostructures.

According to an exemplary embodiment, the dielectric material of the first contact charging member is fluorinated ethylene propylene FEP, the contact side of the member showing a super hydrophobic behaviour, and the dielectric material of the second contact charging member is polyimide PI, the contact side of the member showing a super hydrophilic behaviour.

According to an exemplary embodiment, the cavities of the contact layer of the first contact charging member show an average radius a that is such that the mechanical force $F_{meca}$ of the bottom when deformed up to the opening is at least 5 times, in various instances 10 times larger than the electrostatic force $F_{elec}$ between the contact layer and the contact layer of the second contact charging member.

According to an exemplary embodiment, the mechanical force $F_{meca}$ is $$F_{meca} = = -k_1 \cdot w_{avg}$$

where $k_1$ is the stiffness of the material of the contact layer of the first contact charging member and $w_{avg}$ is the maximum deformation of the bottom divided by 3.

According to an exemplary embodiment, the electrostatic force $F_{elec}$ is $$F_{elec} = -\frac{(\sigma \cdot \pi \cdot a^2)^2}{2} \cdot \frac{d}{dw_{avg}}\left(\frac{1}{C}\right)$$

where σ is the a maximum charge density for the material of the contact layer of the first contact charging member, $w_{avg}$ is the maximum deformation of the bottom divided by 3, and C is the capacitance of the contact layers of the first and second contact charging members.

According to an exemplary embodiment, σ is 50 μC/m² or less.

According to an exemplary embodiment, the capacitance C is $$C = \frac{\varepsilon \cdot \pi \cdot a^2 \cdot atanh\left(\sqrt{\frac{3 \cdot w_{avg}}{g_0}}\right)}{\sqrt{3 \cdot w_{avg} \cdot g_0}}$$

where ε is the permittivity of air and $g_0$ is the distance between the contact side of the contact layer of the second contact charging member and the bottom of the cavities.

The invention is also directed to a process for manufacturing a contact charging member comprising a contact layer with a contact side and a back side, made of a dielectric material that has a triboelectric series rating indicating a propensity to exchange electrons due to a contacting event, comprising the step of patterning the contact side and the back side of the contact layer; wherein the patterning step comprising embossing the contact layer so as to form a series of cavities.

According to an exemplary embodiment, the process comprises a further step of applying an electrode layer on the back side of the contact layer, the contact charging member being according to the invention.

According to an exemplary embodiment, the step of applying an electrode layer comprises a metallisation, in various instances by Physical Vapour Deposition sputtering, of the back side of the contact layer.

According to an exemplary embodiment, the patterning step by embossing comprises the following sub-steps: pressing the contact layer between a positive mould and a negative mould; heating at least one of the moulds up to a temperature greater than the vitreous glass temperature $T_g$ of the thermoplastic dielectric material of the contact layer; cooling down the moulds and the contact layer down to a temperature below the vitreous glass temperature $T_g$; separating the moulds and removing the embossed contact layer.

According to an exemplary embodiment, the process comprises a further step of: forming submicronic and/or nanostructures on the bottom of the cavities on the contact side of the contact layer.

According to an exemplary embodiment, the step of forming submicronic and/or nanostructures is by additive manufacturing deposition of grains and/or spray deposition of particles and/or by Atomic Layer Deposition.

According to an exemplary embodiment, the step of forming submicronic and/or nanostructures is by Reactive Ion Etching.

The invention is also directed to a process for manufacturing moulds for the patterning step by embossing of the invention, comprising the following steps: providing a first metal plate and a second metal plate, the metal being in various instances copper or aluminium; coating a main face of the first metal plate with a negative photoresist mask of the pattern and coating a main face of the second metal plate with a positive photoresist mask of the pattern; applying photolithography to the main faces of the first and second metal plates, provided with the masks; removing the masks on the first and second metal plates; and structuring a relief of the moulds by wet chemical etching in depth of the metal plates on the areas previously not covered by the photoresist masks.

The invention is also directed to a process of dimensioning a contact charging member of a triboelectric generator according to the invention, wherein the average radius a of the cavities of the contact layer of the first contact charging member is selected such that the mechanical force $F_{meca}$ of the bottom when deformed up to the opening is at least 5 times, in various instances 10 times larger than the electrostatic force $F_{elec}$ between the contact layer and the contact layer of the second contact charging member.

The invention is particularly interesting in that the patterned contact charging member allows the construction of efficient and cheap triboelectric generators. The patterning of the invention avoids the unwanted stiction or sticking phenomenon while providing an increased electrical power output. The deformability of the bottoms of the cavities is such that it can deform elastically up to the opening, and possibly even out of the cavity, such as to contact the second charge contact member and produce triboelectricity while showing a stiffness that is high enough to avoid stiction between the two contact sides. In addition, the patterning provides an increased durability and stability of the contact charging member. The manufacturing process by embossing of the contact layer is particularly simple and economic.

DRAWINGS

FIG. 1 exemplarily illustrates different views of a polymer contact layer of a triboelectric generator, where the layer has been honeycomb embossed, in accordance with various embodiments of the invention.

FIG. 2 exemplarily illustrates views of the different steps for embossing the polymer contact layer of FIG. 1, in accordance with various embodiments of the invention.

FIG. 3 exemplarily illustrates views of the different steps for embossing and nanostructuring the polymer contact layer of FIG. 1, in accordance with various embodiments of the invention.

DETAILED DESCRIPTION

Figure 1:
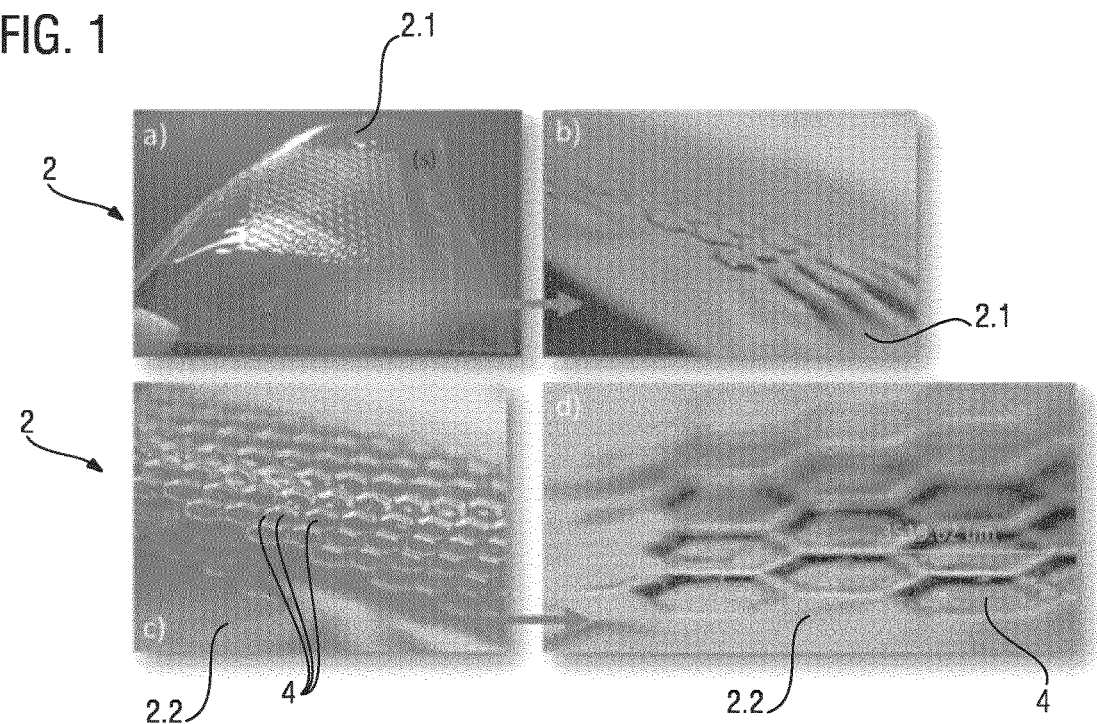

FIG. 1 comprises different views of an embossed polymer film forming a contact layer for a triboelectric generator. The contact layer 2 is a dielectric film with a thickness that is advantageously greater than 20 µm and/or less than 50 µm. The material of the layer 2 is selected among those with a triboelectric series rating indicating a propensity to exchange electrons due to a contacting event.

When two different materials are pressed or rubbed together, the surface of one material will generally capture some electrons from the surface of the other material. The material that captures electrons has the stronger affinity for negative charge of the two materials, and that surface will be negatively charged after the materials are separated. Of course the other material will have an equal amount of positive charge. If various insulating materials are pressed or rubbed together and then the amount and polarity of the charge on each surface is separately measured, a very reproducible pattern emerges. For insulators, the triboelectric table publicly available at the following url https://www.trifield.com/content/tribo-electric-series/ can be used to predict which will become positive vs. negative and how strong the effect will be.

In various instances, the material of the contact layer 2 is a polymer which may be selected from the group consisting of fluorocarbon (PTFE, PFA, FEP, PVDF, PVDF trFE), polyetheretherketones (PEEK), polyetherketones (PEK), polyimides (PI), polyamideimides (PAI), polyamides (PA), polyethylenes (PE), Polyethylene terephthalate (PET, Mylar), polyethersulfones (PES), polyphenylene sulphides (PPS), in various instances fluorinated ethylene propylene FEP. The layer 2 is embossed so at to show a honeycomb pattern. More specifically, views a) and b) show the back side 2.1 of the layer 2, i.e. the side that is intended to be in contact with an electrode. Views c) and d) show the contact side 2.2 of the layer 2, i.e. the layer that is intended to be pressed and/or rubbed against another material for producing electrical power. As is apparent, the honeycomb pattern forms a series of cavities 4 that are for instance hexagonal and imbricated with each other. It goes without saying that the pattern needs not necessarily be a perfect honeycomb with hexagonal shapes as for example circular shapes would also work similarly.

Still with reference to FIG. 1, the average radius of the cavities 4 can be less than, or equal to, 1 mm. The depth of the cavities 4 can be greater than 50 µm and/or less than 140 µm.

Figure 2:
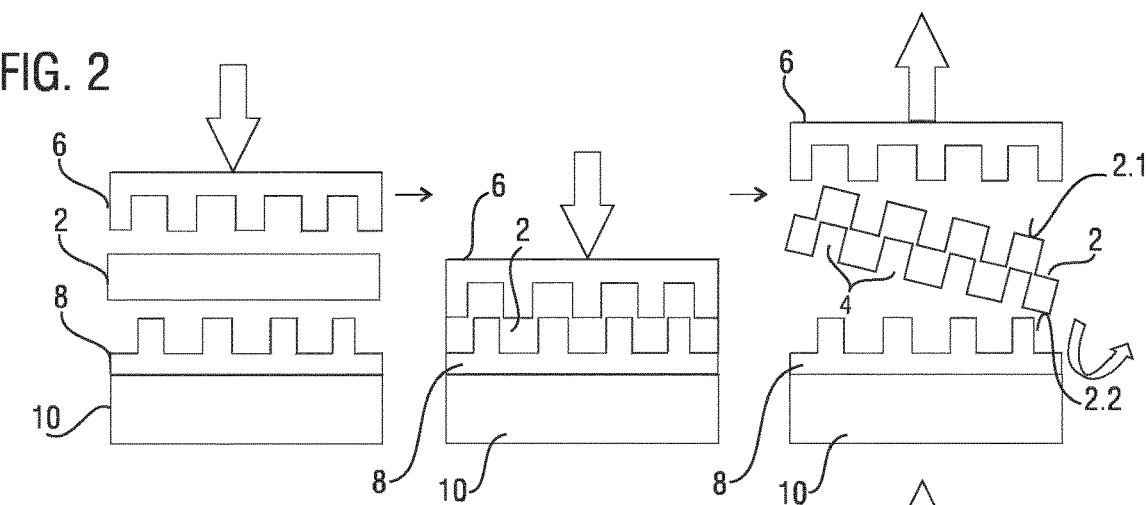
Figure 3:
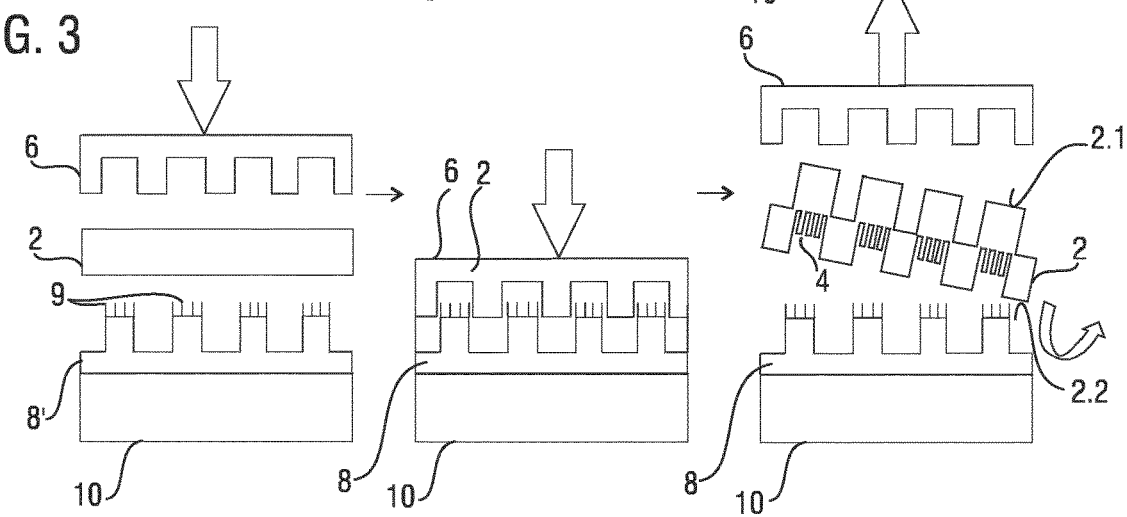

FIGS. 2 and 3 illustrate an embossing manufacturing process of the contact layer of FIG. 1.

With reference to FIG. 2, the film 2 is placed pressed between two moulds, namely a positive mould 6 and a negative mould 8. A heating plate 10 is provided in thermal contact with at least one of the moulds, for instance the negative mould 8. The polymer film is first sandwiched between the positive and negative metallic moulds 6 and 8, with an applied pressure, e.g. of about 15 kPa. Then the heating plate 10 heats up slowly along a temperature ramp (e.g. 14° C./min) towards a set point of 303° C. (higher than the vitreous glass temperature $T_g$ of the polymer). Then the applied pressure is increased, e.g. to about 47 kPa. Hence the plateau phase at 303° C. with this applied pressure can be maintained 10 minutes. After that, the heating is switch off along a cooling ramp (e.g. −11° C./min) towards 100° C. (below $T_g$ of the polymer) where the pressure is removed and the polymer film is removed.

Then the embossed polymer film can be cleaned (e.g. with acetone, isopropanol IPA and deionized water sonicated 5 minutes), and dried at 120° C. on a hotplate or in an oven during 5 minutes to remove water residues.

Additionally, before the sealing of the two contact layers of the tricoelectric generator, it can be considered to increase the specific inner area of contact between the two layers to increase the total net charge densities inside the membrane's units and by the same the output voltage V=Q/C. One way to increase this specific inner area of contact between the dielectric materials 2 and 14 with the respective permittivity $\varepsilon_1$ and $\varepsilon_2$ is to provide nanostructures, or at least submicronic structures.

FIG. 3 illustrates an alternative embossing manufacturing process, differing from the one of FIG. 2 essentially in that the negative mould 8' shows nanostructured cavities 9. Such cavities can be obtained by anodization or chemical etching of the mould. The pressure to be applied might be higher than in the process of FIG. 2.

In alternative or addition to the alternative process of FIG. 3, the inner sides of the contact layers can be subject to additive manufacturing by deposition of nanograins at temperature of process compatible with the polymers specifications (i.e. below the degradation temperature). For instance, spin coating of nanowires (e.g. carbon nanotubes grafted on the polymer by a specific chemistry as diazonium salts grafting or polydopamine grafting, or ALD (Atomic Layer Deposition), with low temperature compatibility for polymers between 80° to 180° C., of dielectrics as $Al_2O_3$, $TiO_2$, ZnO. Wurtzite materials as ZnO, AlN, GaN, CdS deposited by ALD could also add a very advantageous piezoelectric effect for voltage output induced by mechanical strain applied on the device. Depending of the parameters of ALD processing, we can control the free carrier concentration from $10^{20}$ cm$^{-3}$ to $10^{14}$ cm$^{-3}$ with a conductivity range from 0.01 ohm·cm to 2000 ohm·cm, in various instances with a low conductivity configuration of the ZnO layer to maintain the charge generated by tribology.

Also, we can use substractive manufacturing processes by selective etching of the dielectric materials. For instance, dry etching by ICP/RIE (Inductively Coupled Plasma/Reactive Ion Etching) can induce high aspect ratio of nanopillars in polymers without or with a first deposition of protective sacrificial metals dots removed by chemical etching after the dry etching of the nanopillars. To illustrate an example of realization, we applied a plasma RIE dry etching ($O_2$:Ar, P=400 Watts, p=20 mTorr) to obtain submicrometric grains (in the order of 500 nm of diameter) of the inner parts of the polymeric contact layers (FEP and Polyimide PI) of the triboelectric generator. A macroscopic testimony of these nanostructures is the obtained superhydrophobic behavior of FEP and the superhydrophilic behavior of PI with a droplet of deionized water.

The back side of each contact layer (activated by plasma) can be metalized by PVD (Physical Vapor Deposition) sputtering of a metal (gold, aluminum, copper, nickel, silver, platinum) to realize an electrodes. In various instances, the metal would be gold for its chemical resistance against oxidation or corrosion, or Nickel or aluminum for the lower cost.

Figure 4:
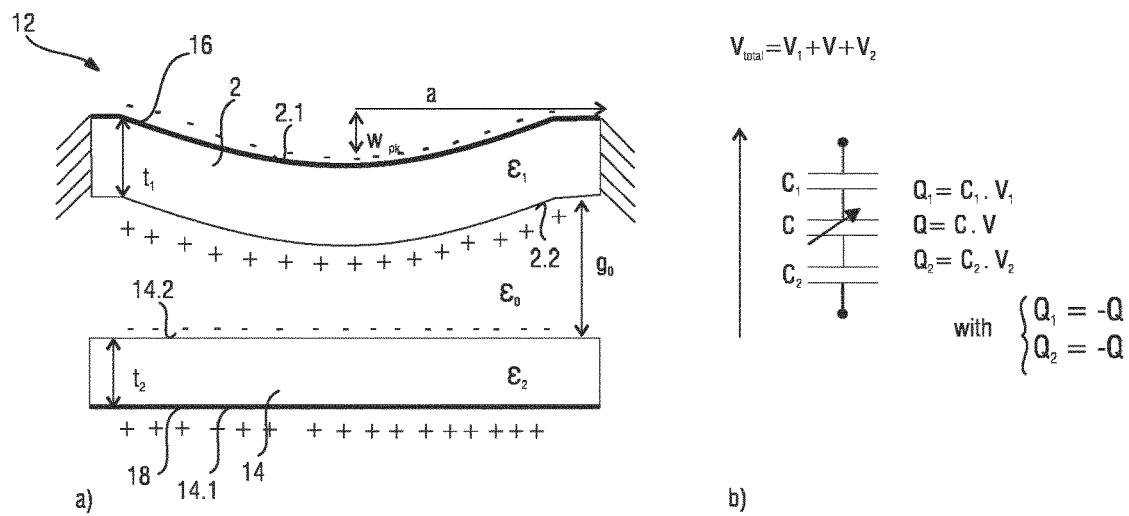
FIG. 4 is an exemplary schematic representation of the deformation of a dielectric contact charging layer of a triboelectric generator where the layer shows a radius a, and is embossed at its periphery, in accordance with various embodiments of the invention.

FIG. 4 illustrates in a schematic way a triboelectric generator 12 comprising a first deformable dielectric contact layer 2, e.g. as detailed here above, and a second dielectric contact layer 14. On the back side 2.1 of the first contact layer is provided a first electrode 16 and, similarly on the back side 14.1 of the second contact layer 14 is provided a second electrode 18. As is apparent, the first contact layer 2 is deformable and clamped or embedded at its periphery. This clamped or embedded mounting corresponds to the periphery of the cavities 4 of the embossed film as discussed here above. In other words, the portion contact layer 2 as illustrated in FIG. 4 corresponds to the bottom wall of one of the cavities 4 of the embossed film where the material of the portion of layer is unity and continuous with the rest of the layer.

The portion of contact layer 2 is deformable under external forces and under attractive forces due to the accumulation of opposite electrical charges, for instance positive charges on the contact side 2.2 of the first layer 2 and negative charges on the contact side 14.2 of the second layer 14. The second layer 14 is considered rigid. The radius a corresponds therefore to the average radius of the cavities 4 (FIGS. 1-3). The gap between the two contact layers 2 and 14 is noted $g_0$. The peak deformation of the layer 2 is noted $w_{pk}$. The generator can be electrically considered as three capacitors $C_1$, C and $C_2$ in series. The capacitances $C_1$ and $C_2$ are considered fixed and correspond to the contact layers 2 and 14, respectively. They are therefore determined by the geometry and the respective permittivity $\varepsilon_1$ and $\varepsilon_2$ of the dielectric material of the two layers. The capacitance C varies with the airgap between the contact layers 2 and 14. By charge compensation effect at equilibrium, one can measure the total voltage $V_{total}$ between the two electrodes 16 and 18 due to the charge Q with $Q_1=C_1 \cdot V_1=Q_2=C_2 \cdot V_2=-Q$. Also, the variation of the capacitance C relative to the deformation of the layer can be expressed as follows:

$$C = \frac{\varepsilon \cdot \pi \cdot a^2 \cdot \mathrm{atanh}\left(\sqrt{\frac{w_{pk}}{g_0}}\right)}{\sqrt{w_{pk} \cdot g_0}}$$

where $\pi \cdot a^2 = S$ represents the surface area of the membrane. It is referred here to I. O. Wygant, M. Kupnik, B. T. Khuri-Yakub, *"Analytically Calculating Membrane Displacement and the Equivalent Circuit Model of a Circular CMUT Cell"*, 2008 IEEE International Ultrasonics Symposium Proceedings, pp. 2111-2114, DOI: 10.1109/ULTSYM.2008.0522, later designated Wygant.

Also according to Wygant, averaging the deflection over the entire plate area shows that the average plate deflection equals ⅓ of the peak deflection such as:

$$w_{avg} = \frac{w_{pk}}{3}$$

With the updated expression of the capacitance:

$$C = \frac{\varepsilon \cdot \pi \cdot a^2 \cdot \operatorname{atanh}\left(\sqrt{\frac{3 \cdot w_{avg}}{g_0}}\right)}{\sqrt{3 \cdot w_{avg} \cdot g_0}}$$

we obtain $$V_{total} = \frac{Q_1}{C_1} + \frac{Q}{c} + \frac{Q_2}{C_2} =$$

$$\frac{Q}{\varepsilon_0 \cdot S} \cdot \left(\frac{\varepsilon_0 \cdot S}{C} - \frac{t_1}{\varepsilon_1} - \frac{t_2}{\varepsilon_2}\right) = \frac{\sigma}{\varepsilon_0} \cdot \left(\frac{\sqrt{3 \cdot w_{avg} \cdot g_0}}{\operatorname{atanh}\left(\sqrt{\frac{3 \cdot w_{avg}}{g_0}}\right)} - \frac{t_1}{\varepsilon_1} - \frac{t_2}{\varepsilon_2}\right)$$

Figure 5:
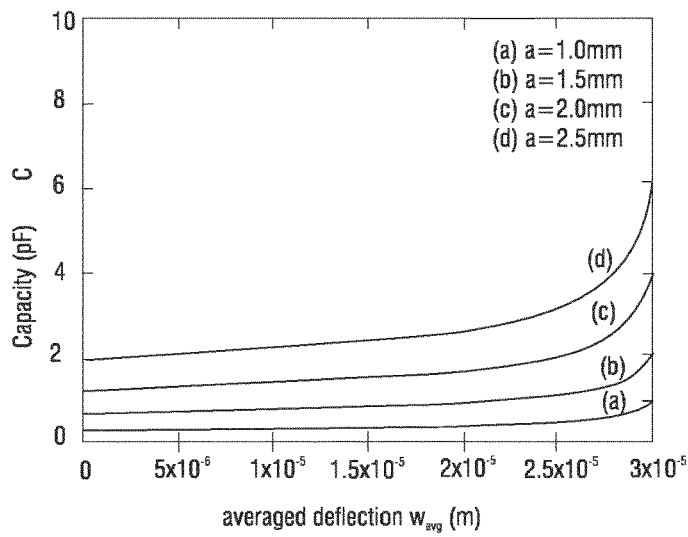
FIG. 5 is an exemplary graph of the capacitance C of the schematic generator of FIG. 4 versus the average deformation $w_{avg}$ for different values of the radius a, in accordance with various embodiments of the invention.
Figure 6:
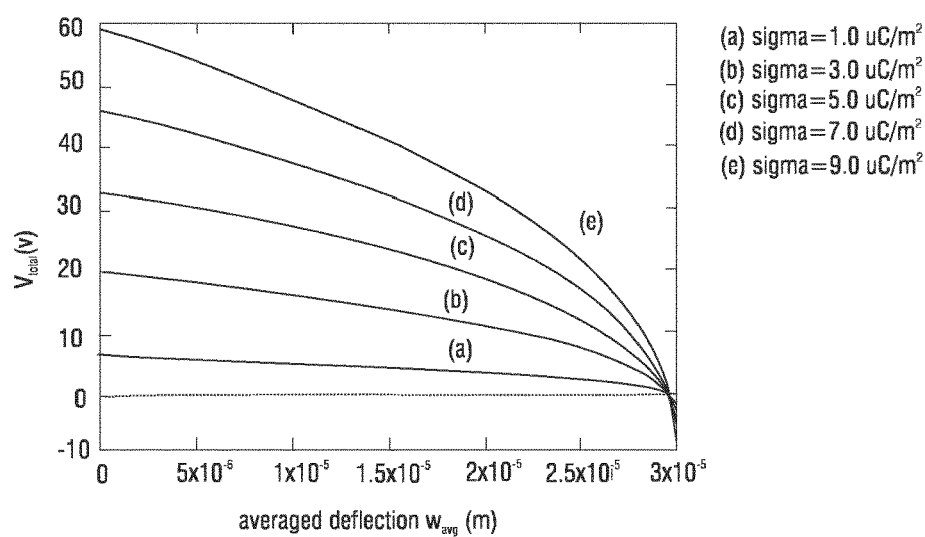
FIG. 6 is an exemplary graph of the voltage of the schematic generator of FIG. 4 versus the average deformation $w_{avg}$ for different charge densities $\sigma$, in accordance with various embodiments of the invention.

The variations of the capacitance C and of the voltage $V_{total}$ versus the deformation of the layer 2 are illustrated in the graphs of FIGS. 5 and 6 for different values of the radius a.

In the meantime, the charge density σ generated on the dielectric by tribology generates an electrostatic force inducing an attractive force between the layers 2 and 14 of dielectric materials $\varepsilon_1$ and $\varepsilon_2$. The relative electrostatic energy is given by:

$$E_{elec} = \frac{1}{2} \cdot \frac{Q^2}{C} = \frac{1}{2} \cdot \frac{(\sigma \cdot \pi \cdot a^2)^2}{C}$$

With the corresponding electrostatic force:

$$F_{elec} = -\nabla E_{elec} = -\frac{1}{2} \cdot Q^2 \cdot \frac{d}{dw_{avg}}\left(\frac{1}{C}\right) = -\frac{(\sigma \cdot \pi \cdot a^2)^2}{2} \cdot \frac{d}{dw_{avg}}\left(\frac{1}{C}\right)$$

This force is dependent of the first derivative of the inverse of the air gap capacitance with:

$$\frac{d}{dw_{avg}}\left(\frac{1}{C}\right) = \frac{\sqrt{3 \cdot w_{avg} \cdot g_0}}{e \cdot 2 \cdot \pi \cdot a^2 \cdot w_{avg} \cdot \operatorname{atanh}\left(\sqrt{\frac{3 \cdot w_{avg}}{g_0}}\right)} - \frac{3}{e \cdot 2 \cdot \pi \cdot a^2 \cdot \left(1 - \frac{3 \cdot w_{avg}}{g_0}\right) \cdot \operatorname{atanh}\left(\sqrt{\frac{3 \cdot w_{avg}}{g_0}}\right)^2}$$

So, in order to counterbalance this electrostatic attractive force and by the same the sticking (i.e. stiction) of the two dielectric materials 2 and 14, the geometry of the contact layer is designed to obtain a high mechanical stiffness with a mechanical force to avoid the sticking. The dimensions of the deformable layer must be set to allow a soft deformation against an applied mechanical pressure on top to generate triboelectrical charge density by mechanical contact of the two dielectric materials. So, a trade-off must be found.

Hence, we can express the stiffness of the deformable layer as follows, according to Wygant:

$$k_1 = \frac{192 \cdot \pi}{a^2} \cdot \frac{E \cdot t^3}{12 \cdot (1 - v^2)}$$

E, t, v being respectively the Young's modulus, the thickness and the Poisson ratio of the deformable layer. This gives the mechanical energy of the spring:

$$E_{meca} = \tfrac{1}{2} \cdot k_1 \cdot w_{avg}^2$$

With the associated mechanical force of the spring, always opposite to the direction of the deflection $w_{avg}$:

$$F_{meca} = -\nabla E_{meca} = -k_1 \cdot w_{avg}$$

The total energy of the system is defined by:

$$E_{total} = E_{elec} + E_{meca}$$

And the total force of the system is:

$$F_{total} = F_{elec} + F_{meca}$$

Figure 7:
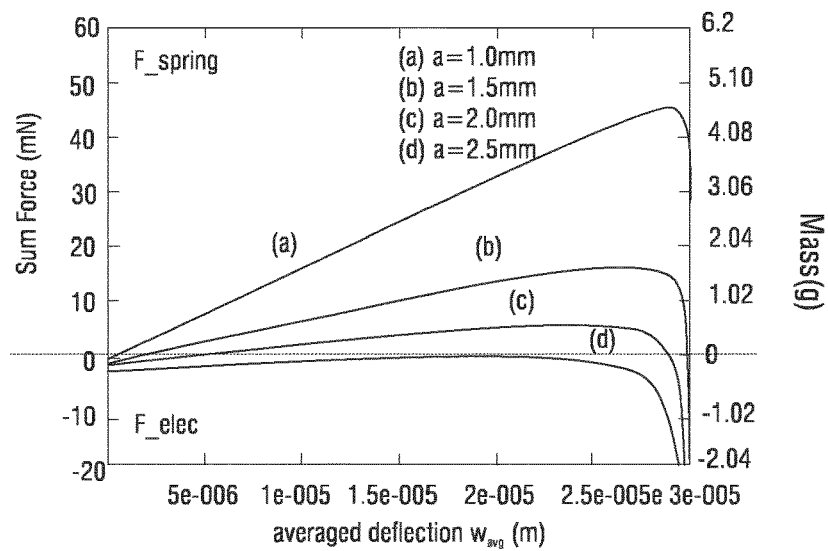
FIG. 7 is an exemplary graph of the electrostatic force and the spring force of the dielectric contact charging layer of the schematic generator of FIG. 4 versus the average deformation $w_{avg}$ for different values of the radius a, in accordance with various embodiments of the invention.
Figure 8:
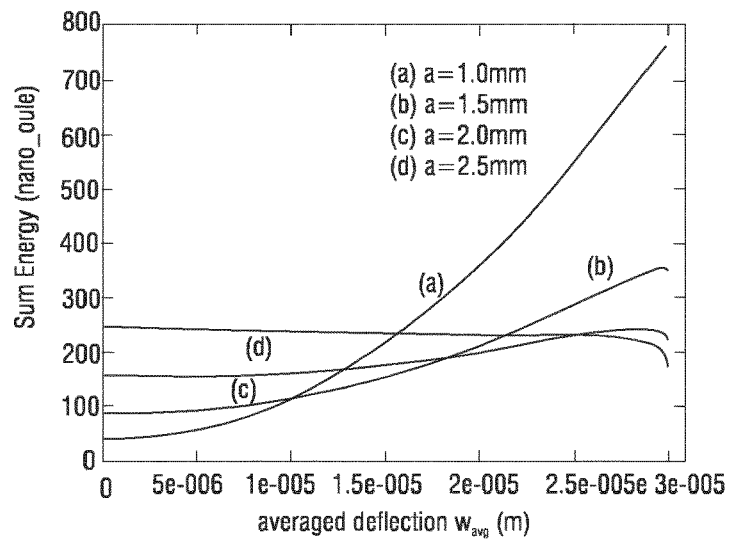
FIG. 8 is an exemplary graph of the energy in the dielectric contact charging layer of the schematic generator of FIG. 4 versus the average deformation $w_{avg}$ for different values of the radius a, in accordance with various embodiments of the invention.

The variations of the force $F_{total}$ and of the energy $E_{total}$ versus the deformation of the layer 2 are illustrated in the graphs of FIGS. 7 and 8 for different values of the radius a. The total force is equal to zero for equilibrium points of the deflection $w_{avg}$. If the first derivative (or slope) at this equilibrium points is positive the deflection position $w_{avg}$ is stable, if the slope is negative the deflection position $w_{avg}$ is unstable. This corresponds to the total energy graph in FIG. 8 where a minimum means that the deflection position $w_{avg}$ is stable, and a maximum means that the deflection position $w_{avg}$ is unstable.

As visible in FIG. 8, the trade-off between mechanical force and attractive electrostatic force is obtained for a membrane radius 0.5 mm≤a≤2 mm, in various instances 0.5 mm≤a≤1 mm, for example a=1 mm to maximize the contact area between the two materials to generate the triboelectric charges. The design of each embossed cavity is determined in term of depth and area to obtain a ratio of the mechanical force $F_{meca}$ of the spring over the electrostatic force $F_{elec}$ higher or equal to 10.

For this example of calculations of the trade-off, we fixed the charge density at 50 μC/m² which is a maximum threshold achievable with the materials considered here (FEP for $\varepsilon_1$, and Polyimide for $\varepsilon_2$) and in accordance with the data in the literature.

In order to demonstrate the advantages of the invention, the following four triboelectric generators have been built:
Configuration (1): "Flat" i.e. no embossing of the polymer contact layers and no plasma treatment of the inner sides;
Configuration (2): "Flat+plasma treatment" i.e. no embossing of the polymer contact layers but with a plasma treatment of the two inner sides;
Configuration (3): "Embossed" i.e. embossing of the FEP contact layer and no plasma treatment of the inner sides;
Configuration (4): "Embossed+plasma treatment" i.e. embossing of the FEP contact layer and plasma treatment of the two inner sides.

Each configuration of the triboelectric generators was connected to the probe 1/10 of an oscilloscope with an input impedance of 10 MOhm, corresponding to the load charge of the generator.

Figure 9:
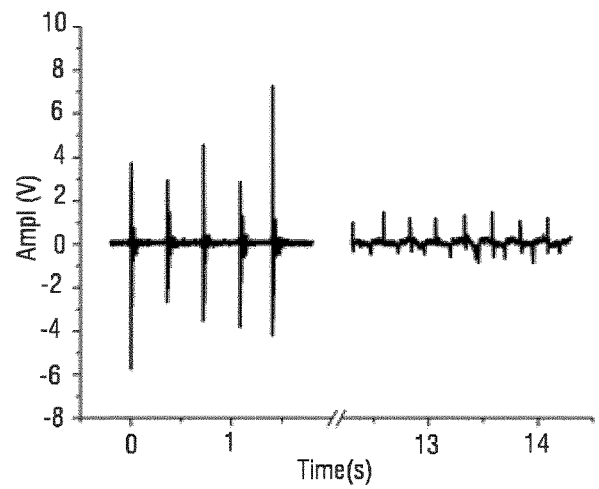
FIG. 9 is an exemplary graph of the voltage output of a conventional flat triboelectric generator versus time, in accordance with various embodiments of the invention.

FIG. 9 shows the voltage output of a conventional "flat" triboelectric generator during time operated in a repetitive contact mode, e.g. by applying successive finger taps. After ten solicitations, we can note a substantial decreasing of the amplitude of the voltage output. Indeed, the repetitive contacts of the two dielectrics materials create electrostatic charges by tribology. These charges of opposite signs for each inner side of the two polymer contact layers create an attractive electrostatic force decreasing the air gap distance between them until a quasi-static cohesion of the two layers, called stiction. This is an issue solved by the present invention using an embossed polymer contact layer.

Figure 10:
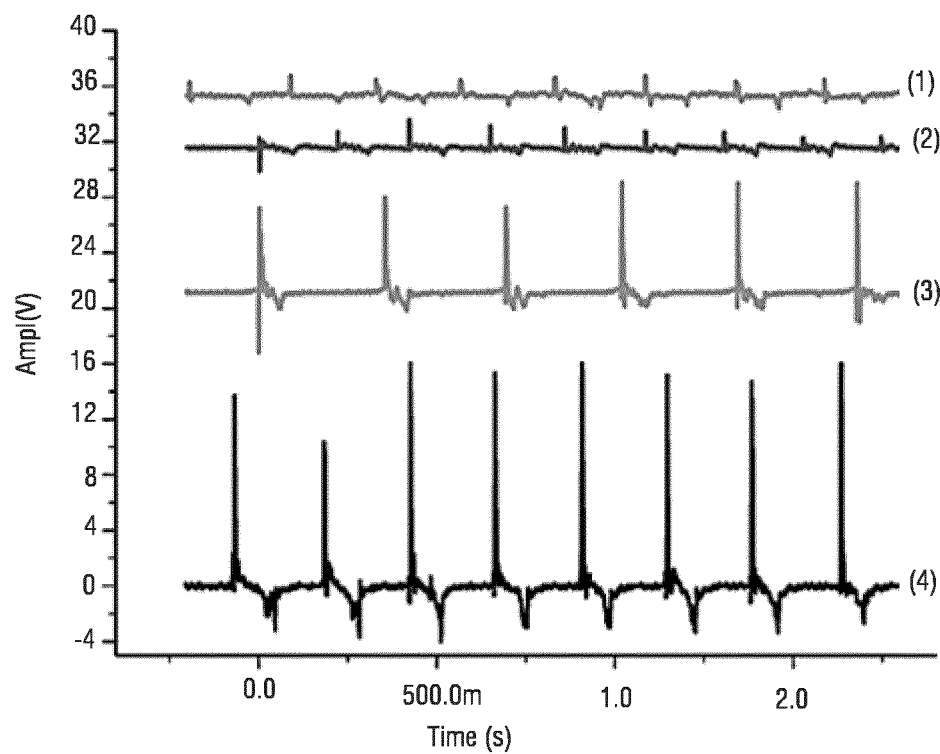
FIG. 10 is an exemplary graph of the voltage outputs of four different triboelectric generators versus time in the contact mode, in accordance with various embodiments of the invention.
Figure 11:
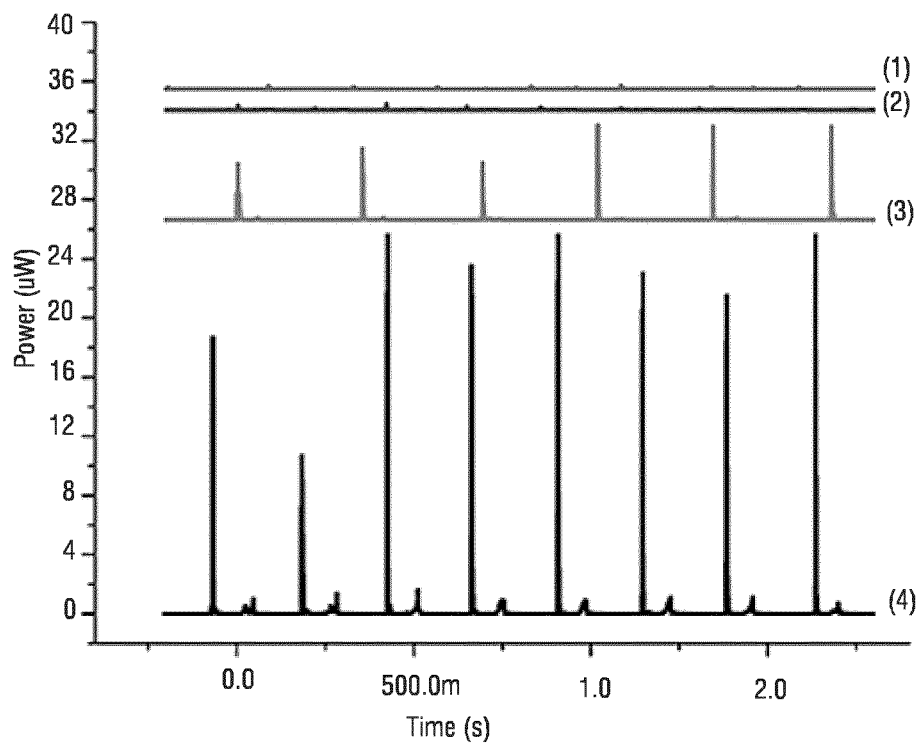
FIG. 11 is an exemplary graph of the power outputs of the four different triboelectric generators of FIG. 10, versus time in the contact mode, in accordance with various embodiments of the invention.

FIGS. 10 and 11 show respectively the output voltage and the instantaneous output electrical power for each of the above four configurations of the triboelectric generators. The electrical outputs are generated by a sequence of several gentle mechanical taps by the end of the finger, after stabilization of the amplitudes during few seconds of tapping. The curves are shifted along the Y axis for the sake of clarity. For the "flat" generator according to the configuration 1, a maximum amplitude of 2 volts has been measured. The plasma treatment of configuration 2 didn't improve this level of voltage output compared to configuration 1. Indeed, the static cohesion due to the attractive force between the two flat polymer contact layers is at the origin of this small amplitude, especially as the charge density is higher. For the embossed generator (configuration 3), we can observe an improvement of the voltage output stabilized to 8 volts of maximum amplitude thanks to the constant air gap maintained between the embossed polymer contact layer (FEP here) and the flat polymer contact layer (Polyimide here).

The adding of a plasma treatment of the inner sides allows to increase the charge density σ and consequently the output voltage (until 16 Volts of maximum amplitude) following the previously stated equation $$V_{total} = \frac{\sigma}{e_0} \cdot \left( \frac{\sqrt{3 \cdot w_{avg} \cdot g_0}}{a\tanh\left(\sqrt{\frac{3 \cdot w_{avg}}{g_0}}\right)} - \frac{t_1}{\varepsilon_1} - \frac{t_2}{\varepsilon_2} \right)$$

Figure 12:
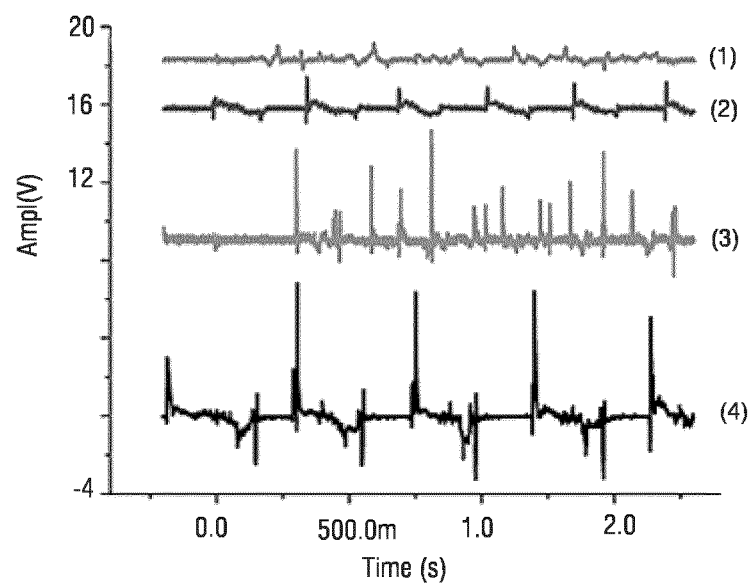
FIG. 12 is an exemplary graph of the voltage outputs of four different triboelectric generators versus time in the sliding mode, in accordance with various embodiments of the invention.
Figure 13:
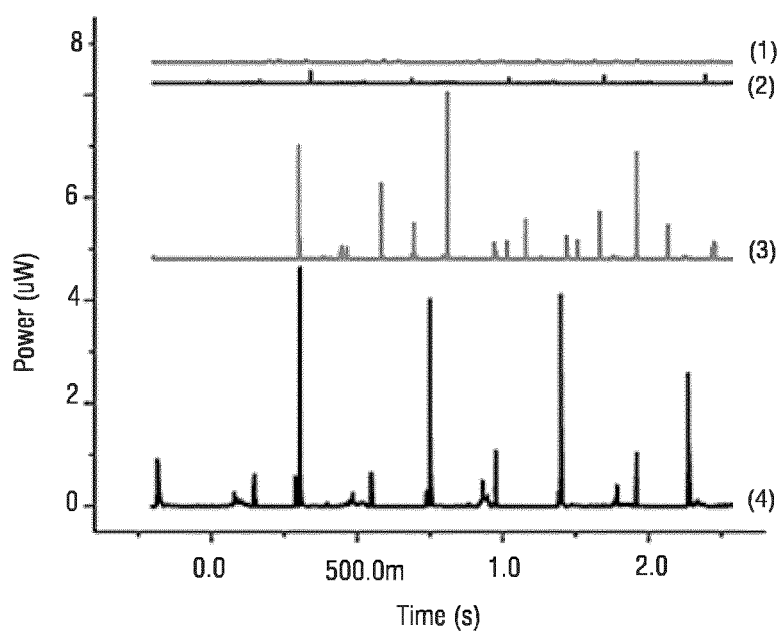
FIG. 13 is an exemplary graph of the power outputs of the four different triboelectric generators of FIG. 12, versus time in the sliding mode, in accordance with various embodiments of the invention.

FIGS. 12 and 13 illustrate, similarly to FIGS. 10 and 11, the output voltage and the instantaneous output electrical power for each of the above four configurations of the triboelectric generators, where the generator are operated in the sliding mode with gentle lateral rubbing with the end of the finger. Although the levels of output are generally lower compared to the contact mode, we observe the same tendency that the embossed structure stabilized higher output voltage, especially with the improvement of charge density σ with the plasma treatment of the inner sides of the polymer contact layers.

The invention claimed is:

1. A contact charging member for a triboelectric generator, comprising:
   a contact layer with a contact side and a back side, made of a dielectric material that has a triboelectric series rating indicating a propensity to exchange electrons due to a contacting event; and
   an electrode layer disposed along the back side of the contact layer;
   wherein the contact side of the contact layer is patterned so as to show a series of cavities, each with an opening and a bottom that is flexible such as to elastically deform up to the opening, and
   wherein the dielectric material of the first contact charging member is fluorinated ethylene propylene FEP, the contact side of the member showing a super hydrophobic behaviour, and the dielectric material of the second contact charging member is polyimide PI, the contact side of the member showing a super hydrophilic behaviour.

2. The contact charging member according to claim 1, wherein the cavities show at least one of the following shapes: circular, hexagonal, rectangular.

3. The contact charging member according to claim 1, wherein the back side is patterned in negative and in correspondence with the contact side.

4. The contact charging member according to claim 1, wherein the dielectric material of the contact layer is a thermoplastic selected from the group consisting of fluorocarbon like PTFE, PFA, FEP, PVDF, and trFE, polyetheretherketones PEEK, polyetherketones PEK, polyimides PI, polyamideimides PAI, polyamides PA, polyethylenes PE, Polyethylene terephthalate PET Mylar, polyethersulfones PES, polyphenylene sulphides PPS, fluorinated ethylene propylene FEP or polyimide PI.

5. The contact charging member according to claim 1, wherein the cavities show an average radius a that is at least one of less than or equal to 2 mm and greater than or equal to 0.5 mm.

6. The contact charging member according to claim 1, wherein the cavities show a constant depth that is at least one of greater than 50 μm and less than 140 μm.

7. A triboelectric generator comprising:
   a first contact charging member comprising a contact layer with a contact side and a back side, made of a dielectric material that has a triboelectric series rating indicating a propensity to exchange electrons due to a contacting event, and an electrode layer disposed along the back side of the contact layer;
   a second contact charging member comprising a contact layer with a contact side and a back side, made of a dielectric material that has a triboelectric series rating indicating a propensity to exchange electrons due to a contacting event, and an electrode layer disposed along the back side of the contact layer;
   wherein the first and second contact charging members have their contact sides in front of each other and are configured to allow at least one of a pressing and sliding contact between the contact sides;
   wherein the contact side of the first contact layer is patterned so as to show a series of cavities, each with an opening wand a bottom that is flexible such as to elastically deform up to the opening, and
   wherein the cavities of the contact layer of the first contact charging member show an average radius a that is such that a mechanical force $F_{meca}$ of the bottom when deformed up to the opening is at least 5 times larger than an electrostatic force $F_{elec}$ between the contact layer and the contact layer of the second contact charging member.

8. The triboelectric generator according to claim 7, wherein the second contact charging member shows a flat contact side with at least one of submicronic and nanostructures.

9. The triboelectric generator according to claim 7, wherein the mechanical force $F_{meca}$ is $$F_{meca} = -k_1 \cdot w_{avg}$$

where $k_1$ is the stiffness of the material of the contact layer of the first contact charging member and $w_{avg}$ is the maximum deformation of the bottom divided by 3; and wherein the electrostatic force $F_{elec}$ is $$F_{elec} = -\frac{(\sigma \cdot \pi \cdot a^2)^2}{2} \cdot \frac{d}{dw_{avg}}\left(\frac{1}{C}\right)$$

where $\sigma$ is the a maximum charge density for the material of the contact layer of the first contact charging member, $w_{avg}$ is the maximum deformation of the bottom divided by 3, and C is the capacitance of the contact layers of the first and second contact charging members.

10. The triboelectric generator according to claim 9, wherein $\sigma$ is 50 μC/m² or less; and
wherein the capacitance C is $$C = \frac{\varepsilon \cdot \pi \cdot a^2 \cdot a\tanh\left(\sqrt{\frac{3 \cdot w_{avg}}{g_0}}\right)}{\sqrt{3 \cdot w_{avg} \cdot g_0}}$$

where $\varepsilon$ is the permittivity of air and $g_0$ is the distance between the contact side of the contact layer of the second contact charging member and the bottom of the cavities.

11. A process for manufacturing a contact charging member comprising a contact layer with a contact side and a back side, made of a dielectric material that has a triboelectric series rating indicating a propensity to exchange electrons due to a contacting event, comprising the step of:
patterning the contact side of the contact layer;
wherein the patterning step comprises embossing the contact layer so as to form a series of circular or hexagonal cavities with a flat bottom;
the process comprising a further step of
applying an electrode layer on the back side of the contact layer, the contact charging member comprising:
the contact layer with the contact side and the back side, made of a dielectric material that has a triboelectric series rating indicating a propensity to exchange electrons due to a contacting event; and
an electrode layer disposed along the back side of the contact layer; and
wherein the contact side of the contact layer is patterned so as to show a series of cavities, each with an opening and a bottom that is flexible such as to elastically deform up to the opening, and
wherein the dielectric material of the first contact charging member is fluorinated ethylene propylene FEP, the contact side of the member showing a super hydrophobic behaviour, and the dielectric material of the second contact charging member is polyimide PI, the contact side of the member showing a super hydrophilic behaviour.

12. The process according to claim 11, wherein the step of applying an electrode layer comprises a metallisation by Physical Vapour Deposition sputtering of the back side of the contact layer.

13. The process according to claim 11, wherein the patterning step by embossing comprises the following sub-steps:
pressing the contact layer between a positive mould and a negative mould;
heating at least one of the moulds up to a temperature greater than the vitreous glass temperature $T_g$ of the thermoplastic dielectric material of the contact layer;
cooling down the moulds and the contact layer down to a temperature below the vitreous glass temperature $T_g$;
separating the moulds and removing the embossed contact layer.

14. The process according to claim 11, comprising a further step of:
forming at least one of submicronic and nanostructures on the bottom of the cavities on the contact side of the contact layer.

15. The process according to claim 14, wherein the step of forming at least one of submicronic and nanostructures is by at least one of additive manufacturing deposition of grains and by Atomic Layer Deposition, wherein the deposited material presents piezoelectric properties and is selected from the following list: wurtzite ZnO; AlN, GaN, and/or CdS.

16. The process according to claim 14, wherein the step of forming at least one of submicronic and nanostructures is by Reactive Ion Etching.

17. A process for manufacturing moulds for manufacturing by embossing a contact charging member comprising a contact layer with a contact side and a back side, made of a dielectric material that has a triboelectric series rating indicating a propensity to exchange electrons due to a contacting event, wherein the contact side of the contact layer is patterned so as to show a series of cavities, each with an opening and a bottom that is flexible such as to elastically deform up to the opening, comprising the following steps:
providing a first metal plate and a second metal plate;
coating a main face of the first metal plate with a negative photoresist mask of the pattern and coating a main face of the second metal plate with a positive photoresist mask of the pattern;
applying photolithography to the main faces of the first and second metal plates, provided with the masks;
removing the masks on the first and second metal plates; and
structuring a relief of the moulds by wet chemical etching in depth of the metal plates on the areas previously not covered by the photoresist masks,
wherein the dielectric material of the first contact charging member is fluorinated ethylene propylene FEP, the contact side of the member showing a super hydrophobic behaviour, and the dielectric material of the second contact charging member is polyimide PI, the contact side of the member showing a super hydrophilic behaviour.

18. A contact charging member for a triboelectric generator, comprising:
a contact layer with a contact side and a back side, made of a dielectric material that has a triboelectric series rating indicating a propensity to exchange electrons due to a contacting event; and
an electrode layer disposed along the back side of the contact layer;
wherein the contact side of the contact layer is patterned so as to show a series of cavities, each with an opening and a bottom that is flexible such as to elastically deform up to the opening, and
wherein the back side is patterned in negative and in correspondence with the contact side.

* * * * *